United States Patent
Gauda

(10) Patent No.: US 9,819,663 B1
(45) Date of Patent: Nov. 14, 2017

(54) DATA PROTECTION FILE SYSTEM

(71) Applicant: ThinAir Labs, Inc., Palo Alto, CA (US)

(72) Inventor: Anthony Gauda, Palo Alto, CA (US)

(73) Assignee: ThinAir Labs, Inc., Mountain View, CA (US)

( * ) Notice: Subject to any disclaimer, the term of this patent is extended or adjusted under 35 U.S.C. 154(b) by 0 days.

(21) Appl. No.: 14/664,596

(22) Filed: Mar. 20, 2015

Related U.S. Application Data

(60) Provisional application No. 61/974,424, filed on Apr. 2, 2014.

(51) Int. Cl.
H04L 29/06 (2006.01)
G06F 17/30 (2006.01)
G06F 21/62 (2013.01)

(52) U.S. Cl.
CPC .......... *H04L 63/08* (2013.01); *G06F 17/3007* (2013.01); *G06F 21/6218* (2013.01)

(58) Field of Classification Search
CPC ... H04L 63/10; H04L 63/101; H04L 63/0263; G06F 21/6218; G06F 21/604
USPC .......................................................... 726/4
See application file for complete search history.

(56) References Cited

U.S. PATENT DOCUMENTS

| 6,507,911 B1* | 1/2003 | Langford | G06F 21/6209 713/193 |
| 6,839,844 B1* | 1/2005 | Okano | G09C 5/00 380/246 |
| 2002/0007347 A1* | 1/2002 | Blumenthal | G06F 21/105 705/51 |
| 2002/0016912 A1* | 2/2002 | Johnson | G06F 11/1464 713/165 |
| 2002/0071557 A1* | 6/2002 | Nguyen | G07F 17/32 380/251 |
| 2003/0095659 A1* | 5/2003 | Ishihara | H04L 9/001 380/46 |
| 2007/0156659 A1* | 7/2007 | Lim | G06F 21/6227 |
| 2009/0150169 A1* | 6/2009 | Kirkwood | G06Q 10/00 705/342 |
| 2010/0145917 A1* | 6/2010 | Bone | G06F 17/30082 707/694 |

OTHER PUBLICATIONS

Mazieres, David. "A Toolkit for User-Level File Systems." USENIX Annual Technical Conference, General Track. 2001.*
Saito, Yasushi. "Jockey: a user-space library for record-replay debugging." Proceedings of the sixth international symposium on Automated analysis-driven debugging. ACM, 2005.*

* cited by examiner

*Primary Examiner* — Syed Zaidi

(74) *Attorney, Agent, or Firm* — Van Pelt, Yi & James LLP

(57) ABSTRACT

Protecting content is disclosed. A request for a file system operation is intercepted. A user-defined callback that corresponds to the file system operation is identified. The user-defined callback that secures the file system operation is executed. The user-defined callback may be used for pre or post-processing of data, authentication, and/or other use cases.

19 Claims, 15 Drawing Sheets

DATA PROTECTION FILE SYSTEM

CROSS REFERENCE TO OTHER APPLICATIONS

This application claims priority to U.S. Provisional Patent Application No. 61/974,424 entitled METHODS AND SYSTEMS FOR EMBEDDING DATA PROCESSING AND AUTHENTICATION EXTENSIONS WITHIN A FILE SYSTEM filed Apr. 2, 2014 which is incorporated herein by reference for all purposes.

BACKGROUND OF THE INVENTION

A file system (or filesystem) may be used to control how data is stored and retrieved. Without a file system, information placed in a storage area may be one large body of data with no way to tell where one piece of information stops and the next begins. By separating the data into individual pieces, and giving each piece a name, the information may be easily separated and identified. In a file system, each piece of data may be called a "file." The structure and logic rules used to manage the groups of information and their names may be referred to as a "file system." There are different types of file systems. Each type of file system may have a different structure and logic, properties of speed, flexibility, security, and size. Some file systems may have been designed to be used for specific applications. File systems may be used on many different types of storage devices including hard drives, removable storage, flash drives, magnetic disks, tape storage, optical disc, and flash memory, etc.

BRIEF DESCRIPTION OF THE DRAWINGS

Various embodiments of the invention are disclosed in the following detailed description and the accompanying drawings.

DETAILED DESCRIPTION

Figure 1:
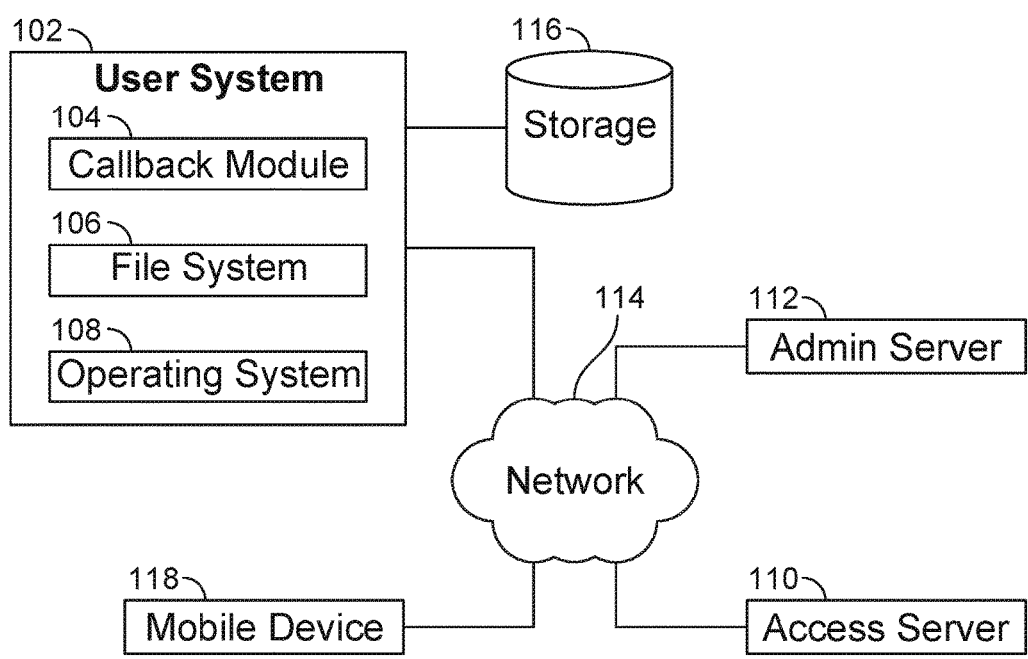
FIG. 1 is a block diagram illustrating an embodiment of a system for protecting data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Traditionally, data protection has been implemented in a top down approach where a system administrator specifies a data protection policy that gets implemented across all files of a storage for every user of the storage. These data protection policies are often complex and difficult to implement correctly to encompass all use cases. For example, usually the system administrator is the only person allowed to establish data protection policies and mechanisms while the end user without this ability is the person that knows best about contents of files and whether it should be protected. This may cause the system administrator to set security policies that are either too strict or too lax. Additionally, if complying with the security policy is too difficult, the end user may ignore or bypass the data protection policy compliance and/or suffer from poor user experience. Thus there exists a need for a data protection mechanism that is highly flexible and easy to utilize.

Traditional file systems typically provide a static feature set which cannot be easily extended beyond a user's desired or predetermined use cases. For example, traditional file systems do not have built in script-based execution environments for defining behaviors that dynamically change the properties of the file system during execution.

In some embodiments, a dynamic execution environment within a file system is provided. This may be used for pre or post-processing of data, authentication, and other use cases. For instance a user can define a script that dynamically redacts credit card numbers from files as they are read from disk. The script may be stored on a remote network server to prevent unauthorized modification. Another example is identifying the executable of the process that is reading a particular file and denying access unless it is on a whitelist of approved applications that can access this document.

In some embodiments, virtual file systems are provided that reside in kernel space. A kernel space may manage input/output requests from software and translate them into data processing instructions for the central processing unit and other electronic components of a computer. In some embodiments, users are able to manage activity in kernel space, which is ordinarily inaccessible by users.

The term "callback," as used herein, generally refers to executable code that is passed as an argument to other code, which is expected to call back (e.g., execute) the argument at a given point in time. A callback may be a script. In some examples, the invocation is immediate, as in a synchronous callback, or it may happen at a later time, as in an asynchronous callback.

In some embodiments, a file system with embedded data processing and authentication extensions is utilized. Such file system can have one or more preset or user-defined callback entry points, such as, for example, open, before open, before close, close, write and read. Such callbacks may be scripts and/or predefined extensions that can be configurable. The file system may have an embedded virtual machine and execution environment. The file system may also use native modules and code for executing various features and functionalities of the file system. Extensions may be scripts that define callbacks that are executed by a client when accessing the file system. The client may be installed on a computer system (e.g., personal computer, mobile device, server, etc.) that is capable of implementing virtual file systems.

In some embodiments, a user is able to define hosts (e.g., personal computers, servers, mobile devices, etc.) that include client applications that are programmed to implement virtual file systems provided herein. The client applications (or software) can virtually create one or many virtual files systems which are defined as volumes. In some situations, using a user interface (e.g., web-based interface), the user may create and manage a volume, and attach the volume to any number of hosts. Volumes that are connected to multiple hosts may behave like shared storage. Any content that does not fit on a given device may be streamed in real time. In some examples, this may be similar to using a local disk as cache and other content is swapped in and out as required without any involvement from the user or interference with the activity of the user.

In some embodiments, a virtual environment layer enables the execution of preset or user-defined scripts at the file system level. Such scripts, once executed by a computer processor, may enable various features and functionalities associated with accessing files in the file system, such as reading, writing, opening, and closing files. For example, the user may provide a script in the file system that can be executed when the file system opens a given type of file, and the script can remove certain information (e.g., metadata) from the file. In some embodiments, a user may build policies and scripts using predefined triggers and actions. This may enable a user that does not have the level of experience as a computer programmer to customize a file system.

In some embodiments, a user is able to generate scripts for execution in a virtual environment of a file system. The method can be executed by a computer system (see, e.g., FIG. 2) that is programmed or otherwise configured to implement a virtual file system layer on top of a physical (or more concrete) file system. The system can include an operating system, and the file system can be integrated with the operating system or separate from the file system.

In some embodiments, a user may utilize an administration interface to select a callback entry point to associate/upload/type/choose (from a library) a script or function which responds to the callback with the desired functionality. A library (e.g., created by a user or another entity) of predefined extensions or scripts that a user can choose from may be provided. The user may also upload or define user-defined scripts. The user may also use a policy engine to create an extension.

The administration interface may communicate with registered callbacks to a file system processing module. The administration interface may communicate registered callbacks securely. In some examples, this can be by alias or entirety. That is, instead of communicating the whole script, the system can communicate an alias of a previously defined or communicated script.

The operating system may trigger a callback event such as open, read, write, etc. The operating system may communicate the callback event to the virtual file system layer. When the virtual file system layer recognizes an event, the virtual file system layer may execute an appropriate callback from the callback module that has been predetermined for that event. An example of an event includes the opening of a file.

In some embodiments, the callback that has been executed performs a predetermined action. Control may then be returned to the file system. For example, the callback may disallow file access if a given filename includes "confidential." In such a case, access may be disallowed until a third party has authorized access. The appropriate response is then sent to the operating system. For example, upon reading a file, an extension can scan the data and determine if a given type of data (e.g., personally identifiable information, or PII) exists. If it does exist, then the system can redact the given type of data by replacing it with other data, character(s) or a string of characters (e.g., Xs). The system may also deny reads entirely based on physical location of the user or time of access.

In some embodiments, by being embedded in a file system, a callback module can be highly resistant to various security breaches, such as malicious attacks. Disk subsystems may be configured to have encrypted data at rest such that the only route to access the data is through the file system. Such virtual file system may thus provide users with various user-defined features without compromising security.

For example, a computer system comprises a file system with a virtual file system layer. The virtual file system layer is programmed to execute callbacks. A user creates a callback to provide authentication based on geolocation, two-factor authorization, or content being accessed. The computer system monitors system events. Once an event meets criteria specified by the callback, a predetermined action is performed in the virtual file system layer. For example, upon file access, content can be dynamically modified during read operations to redact or remove sensitive data, such as credit card numbers or authorization identifiers. Files can be marked as append-only and deny all reads.

FIG. 1 is a block diagram illustrating an embodiment of a system for protecting data. User system 102, mobile device 118, administrator server 112, and access server 110 are connected together via network 114. Examples of user system 102 include a desktop computer, a laptop computer, and another computer being utilized to access protected data. For example, a user utilizes user system 102 to access data stored in storage 116. Examples of storage device 116 include a local hard drive and a removable storage of user system 102. In some embodiments, storage 116 stores data of user system 102 and at least a portion of stored data is protected. For example, at least some files stored in storage 116 are encrypted and access to the encrypted file(s) is protected. User system 102 includes call back module 104, file system 106, and operating system 108. In an alternative embodiment, storage 116 is a networked storage that is connected to network 114.

In some embodiments, file system 106 is a virtual file system that extends an existing file system of user system 102 to implement data protection and security features. For example, when a file system operation is provided to operating system 108 by one or more applications running on user system 102, operating system 108 issues the operation to file system 106 that has been configured to perform data protection by allowing different levels of access to protected content based on security parameters. By integrating data protection directly into the file system that is the gateway to content, data protection can be more completely implemented in a user-friendly approach. In some embodiments, file system 106 includes a virtual file system that implements data protection features on top of a traditional file system that provides access to data storage. In some embodiments, file system 106 resides in kernel space. A kernel space may manage input/output requests from software and translates them into data processing instructions for the central processing unit and other electronic components of a computer. In some embodiments, users are able to manage activity in kernel space, which is ordinarily inaccessible by users.

Callback module 104 may store and/or provide scripts, policies, and/or code implementing data protection processing to be executed at a given point in time. For example, a file system operation of file system 106 may execute code obtained from the callback module to implement data protection associated with the file system operation and the data being protected. Code from callback may be utilized for pre or post-processing of data, authentication, and other use cases. For example, a user defines a script that dynamically redacts credit card numbers from a protected file when a file system operation to read the protected file is performed. In another example, code of the callback module that gets executed when a file read operation is issued identifies the executable of a process that requested the file read operation and denies access unless the process is on a whitelist of approved applications that can access the protected file. In some embodiments, callback module 104 is stored in admin server 112 and/or access server 110 to stored code on a remote network server to prevent unauthorized modification.

In some embodiments, an administrator user utilizes admin server 112 to manage data security of one or more user systems (e.g., 102). For example, admin server 112 provides a user interface console to allow the administrator user to set security policies, establish scripts, specify callbacks, manage encrypted storage partitions, view a security log, etc. In some embodiments, a user of user system 102 may utilize admin server 112 to manage data security of user system 102. For example, the user logs in to admin server 112 to access a webpage interface that can be utilized to manage data protection (e.g., set security policies, establish scripts, specific callbacks, manage encrypted storage partitions, view a security log, etc.) of user system 102.

In some embodiments, encryption and/or decryption keys to encrypt and/or decrypt protected data of user system 102 (e.g., stored in storage 116) is provided and/or stored by access server 110. For example, user system 102 requests a decryption key to decrypt protected when a request to access protected is received. In some embodiments, access server 110 and admin server 112 are included in the same system.

In some embodiments, mobile device 118 is utilized to authenticate a user of user system 102. For example, mobile device 118 is considered a trusted device of the user of user system 102 and the user inputs a password and/or biometric identification to mobile device 118 to authenticate the user. Once the user is authenticated with mobile device 118, mobile device 118 may be utilized to authenticate the user to user system 102 to allow the user to access protected contents of user system 102. In some embodiments, when a protected content of user system 102 is attempted to be accessed, a notification is provided to mobile device 118 and the authenticated user of mobile device 118 is able to authorize and/or deny the access to the protected content. In some embodiments, physical proximity between user system 102 and mobile device 118 is required when mobile device 118 is utilized to authenticate a user and/or access to protected content. For example, a local wireless connection (e.g., BLUETOOTH) must be established between user system 102 and mobile device 118 and/or a camera of mobile device 118 must capture an identifier displayed on a display of user system 102 to prove physical proximity between user system 102 and mobile device 118.

The components shown in FIG. 1 may be implemented in one or more computers, servers, storage devices, networking components, and/or virtual components/networks. For example, any number of components shown in FIG. 1 may be included in any number of devices. One or more of the following may be included in network 114: a direct or indirect physical communication connection, mobile communication network, Internet, intranet, Local Area Network, Wide Area Network, Storage Area Network, a wireless network, a cellular network, and any other form of connecting two or more systems, components, or storage devices together. Other communication paths may exist and the example of FIG. 1 has been simplified to illustrate the example clearly. Although single instances of components have been shown to simplify the diagram, additional instances of any of the components shown in FIG. 1 may exist. For example, storage 116 may be a distributed storage. In another example, a plurality of user systems is connected to one or more admin server(s) and access server(s). In some embodiments, components not shown in FIG. 1 may also exist.

Figure 2:
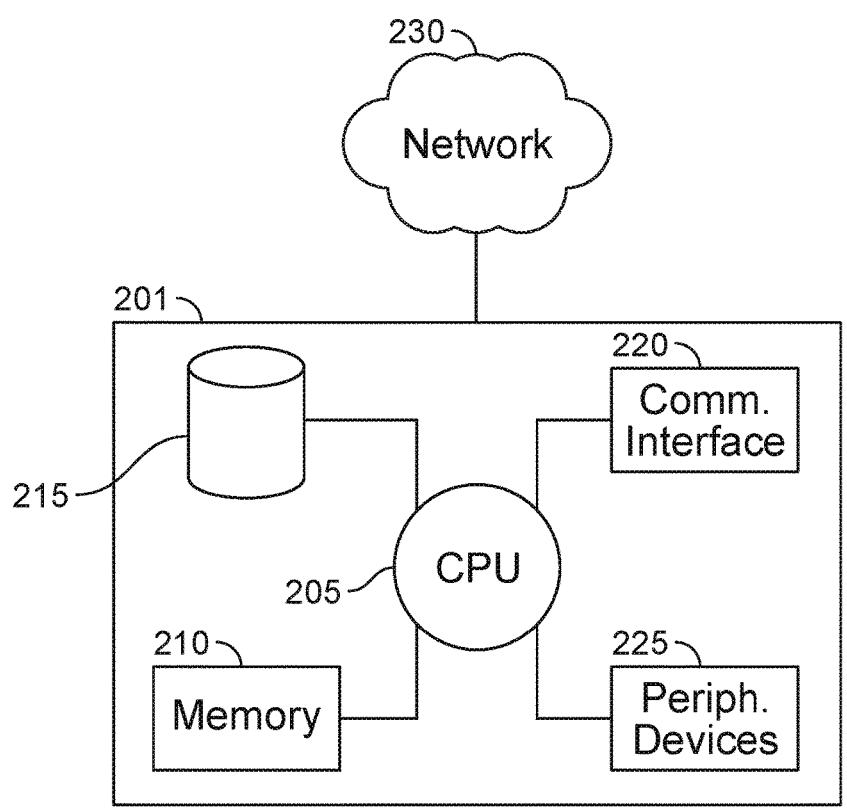
FIG. 2 is a block diagram illustrating an embodiment of computer system 201 that is programmed or otherwise configured to provide a virtual file system layer for the execution of callbacks.

FIG. 2 is a block diagram illustrating an embodiment of computer system 201 that is programmed or otherwise configured to provide a virtual file system layer for the execution of callbacks. In some embodiments, user system 102 of FIG. 1 is included in computer system 201. The computer system 201 includes a central processing unit (CPU, also "processor" and "computer processor" herein) 205, which can be a single core or multi core processor, or a plurality of processors for parallel processing. The computer system 201 also includes memory or memory location 210 (e.g., random-access memory, read-only memory, flash memory), electronic storage unit 215 (e.g., hard disk), communication interface 220 (e.g., network adapter) for communicating with one or more other systems, and peripheral devices 225, such as cache, other memory, data storage and/or electronic display adapters. The memory 210, storage unit 215, interface 220 and peripheral devices 225 are in communication with the CPU 205 through a communication bus (solid lines), such as a motherboard. The storage unit 215 can be a data storage unit (or data repository) for storing data. The computer system 201 can be operatively coupled to a computer network ("network") 230 with the aid of the communication interface 220. The network 230 can be the Internet, an internet and/or extranet, or an intranet and/or extranet that is in communication with the Internet. The network 230 in some cases is a telecommunication and/or data network. The network 230 can include one or more computer servers, which can enable distributed computing, such as cloud computing. The network 230, in some cases with the aid of the computer system 201, can implement a peer-to-peer network, which may enable devices coupled to the computer system 201 to behave as a client or a server.

CPU 205 can execute a sequence of machine-readable instructions, which can be embodied in a program or software. The instructions may be stored in a memory location, such as the memory 210. Examples of operations performed by the CPU 205 can include fetch, decode, execute, and writeback.

Storage unit 215 can store files, such as drivers, libraries, and saved programs. The storage unit 215 can store user data, e.g., user preferences and user programs. The computer system 201 in some cases can include one or more additional data storage units that are external to the computer system 201, such as located on a remote server that is in communication with the computer system 201 through an intranet or the Internet.

Computer system 201 can communicate with one or more remote computer systems through the network 230. For instance, the computer system 201 can communicate with a remote computer system of a user (e.g., administrator). The remote computer system can be a personal computer (PC). Examples of remote computer systems include mobile or portable PC's, slate or tablet PC's (e.g., Apple® iPad, Samsung® Galaxy Tab), telephones, smart phones (e.g., Apple® iPhone, Android-enabled device, Blackberry®), or personal digital assistants. The user can access the computer system 201 via the network 230.

Methods as described herein can be implemented by way of machine (e.g., computer processor) executable code stored on an electronic storage location of the computer system 201, such as, for example, on the memory 210 or electronic storage unit 215. The machine executable or machine readable code can be provided in the form of software. During use, the code can be executed by the processor 205. In some cases, the code can be retrieved from the storage unit 215 and stored on the memory 210 for ready access by the processor 205. In some situations, the electronic storage unit 215 can be precluded, and machine-executable instructions are stored on memory 210.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, a hard disk, magnetic tape, any other magnetic medium, a CD-ROM, DVD or DVD-ROM, any other optical medium, punch cards/paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 201 can include or be in communication with an electronic display that comprises a user interface (UI) for providing, for example, a user with the ability to generate callbacks. Examples of UIs include, without limitation, a graphical user interface (GUI) and a web-based user interface.

In some embodiments, the computer system 201 is programmed to generate and distribute user-generated extensions. The system can include a library of extensions. Users can select extensions from the library, which can subsequently be added to their virtual file systems. Such extensions can be distributed in a virtual marketplace, such as in a distributed fashion. The system can allow multiple implementation languages, as well as an IDE for creating extensions. The system can include a web-based or graphical user interface. The system can facilitate communication between external data sources and extensions to impact results. For instance, the system can use a geolocation service (e.g., GEOIP) via a network call to determine or approximate the physical location of the user and deny or authorize access to the user based on the results. As another example, the system can perform geofencing of access and have granular control of what type of access is granted (e.g., full read, redacted/augmented read, or zero read).

Figure 3:
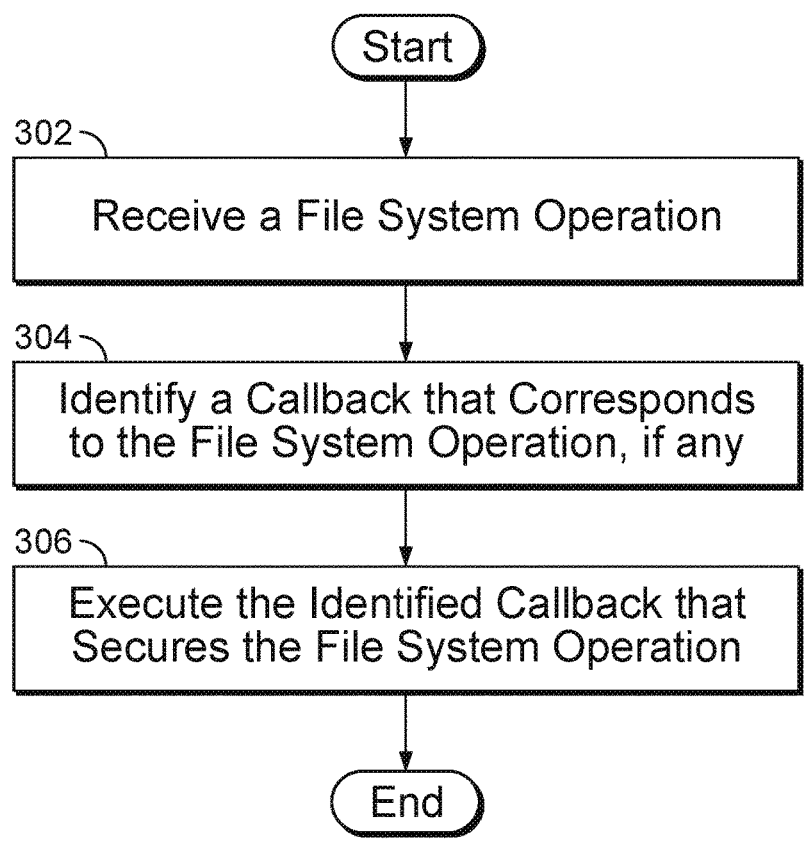
FIG. 3 is a flow chart illustrating an embodiment of a process for securing a file system operation.

FIG. 3 is a flow chart illustrating an embodiment of a process for securing a file system operation. The process of FIG. 3 may be implemented using one or more components of user system 102 of FIG. 1.

At 302, a file system operation is received. In some embodiments, the file system operation is received at a file system from an operating system and/or application. For example, the operating system and/or application requests access to a file to read, modify, and/or delete the file. In some embodiments, the file system operation has been intercepted by a virtual file system that encapsulates operation of one or more underlying file system operations. For example, a base file system has been extended to enable data protection at the file system level. By enabling data protection at the file system operation level, the data protection may be compatible with any application/process without modification to the application/process. In some embodiments, the received file system operation identifies the application and/or process that requested the file system operation and the target file of the file of the file system operation.

At 304, a callback that corresponds to the file system operation, if any, is identified. For example, data protection code that corresponds to the file system operation is identified. In some embodiments, an end user and/or an administrator specifies one or more data protection callbacks to be executed in conjunction with the file system operation. For example, for each type of file system operation, a user is able to specify the specific data protection callback code to be executed for the file system operation type. The callback may be specified to be executed before, after, and/or during the requested file system operation. The callback may be identified based at least in part on a type of the file system operation, a user of the file system operation, a requesting application/process of the file system operation, and/or a target file of the file system operation. For example, only certain target files that are to be protected are to be processed by the callback to protect the protected files. In some embodiments, the callback that corresponds to the file system operation is identified based on a user specified data protection configuration. In some embodiments, the callback is selected from a plurality of eligible user-defined callbacks. For example, a user has defined and identified the callback for the file system operation. In some embodiments, the callback was selected for the file system operation from a plurality of predefined callbacks provided to a user. In some embodiments, one or more callbacks to be executed for the file system operation are configurable, reconfigurable, definable, and/or customizable.

At 306, the identified callback that secures the file system operation is executed. The callback may be executed before, after, and/or during the underlying file system operation requested (e.g., underlying file read, write, close, open, delete, etc.). In some embodiments, executing the callback includes decrypting a target file of the file system operation. In some embodiments, the callback may disallow file access if a target file has been identified as a protected file. In such a case, access may be disallowed until a third party has authorized access. The appropriate response is then sent to the operating system. For example, upon reading a file, a callback code can scan the data and determine if a given type of data (e.g., personally identifiable information, or PII) exists. If it does exist, then another callback redacts the given type of data by replacing it with other data, character(s), or a string of characters (e.g., Xs). Another callback may also deny reads entirely based on physical location of the user or time of access. In some embodiments, the file system operation has been secured because the callback/code that secures the file system operation is configured to be executed for the file system operation.

Figure 4:
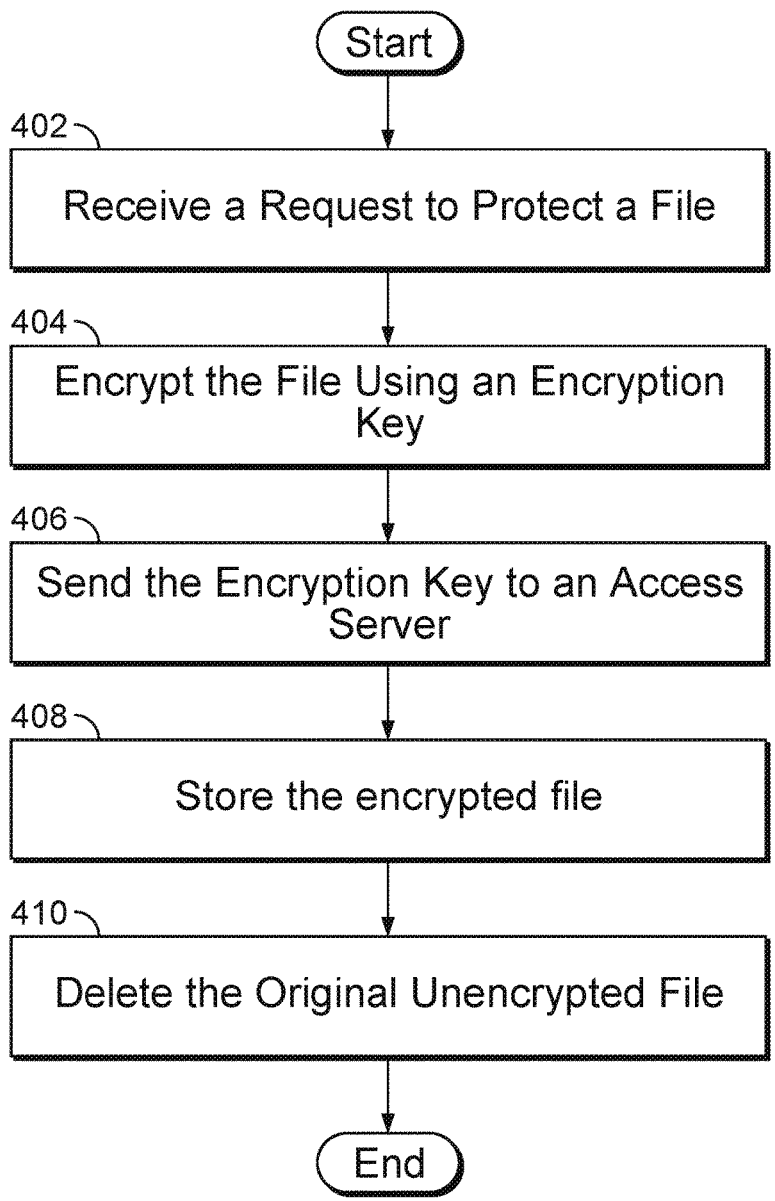
FIG. 4 is a flow chart illustrating an embodiment of a process for specifying a file to be protected.

FIG. 4 is a flow chart illustrating an embodiment of a process for specifying a file to be protected. The process of FIG. 4 may be implemented using one or more components of user system 102 of FIG. 1.

At 402, a request to protect a file is received. In some embodiments, not all files of a storage are protected. For example, because protecting a file utilizes resources, only those files that are identified to be protected are protected. In some embodiments, the request is received from an end user of the protected file. For example, the request is received from a user of user system 102 of FIG. 1. In some embodiments, the request is received via a selection of a context menu associated with the file. For example, a user selects (e.g., "right clicks") a user interface representation of the file (e.g., icon of the file in a directory) to display a context menu and the user selects an item of the context menu that indicates that the file should be protected. In some embodiments, the request indicates a type and/or level of protection to be applied to the file. For example, a certain file may require a high level of protection that requires full authentication of a specified user before allowing access to any portion of the file, while another file may require a lower level of protection that allows some access to a portion of the file for unauthorized users.

At 404, the file is encrypted using an encryption key. In some embodiments, a different encryption key is generated for each file to be protected. In some embodiments, the encryption key is utilized to perform symmetric encryption. In some embodiments, the encryption is utilized to perform asymmetric encryption (e.g., public key cryptography). In some embodiments, a plurality of encryption keys is utilized to encrypt multiple levels of protection of varying access levels for the same protected file. For example, a first encryption key is utilized to encrypt a full not redacted version of the file and a second encryption key is utilized to encrypt a redacted version of the file. Various versions of varying levels of redactions may be encrypted using different encryption keys. By providing a decryption key that only decrypts the version to be granted access, varying levels of access to the protected file may be granted. In some embodiments, the encrypted file may be encrypted in a manner such that a portion of the file (e.g., redacted version) can be obtained from the encrypted file without decrypting the encrypted file.

At 406, the encryption key is sent to an access server. In some embodiments, the encryption is also the decryption key of the file and by not storing the encryption key with the encrypted file, security of the file is protected. The access server (e.g., server 110 of FIG. 1) may receive the encryption key and store the encryption key. The access server may later provide the encryption key to decrypt the encrypted file when requested if the request to access the file is authorized.

At 408, the encrypted file is stored. In some embodiments, the encrypted file is stored in a separate logical volume of a storage from the original volume where unprotected files, the original file, are stored. For example, a large encrypted volume file includes contents of various encrypted files and the encrypted file is stored within the large encrypted volume file. In some embodiments, the encrypted file is stored in a separate physical volume of a storage from the volume where unprotected files are stored. In some embodiments, by storing the encrypted file at a user storage rather than at a remote storage, faster access to the encrypted file may be achieved. In some embodiments, the encrypted file may be freely copied, backed up, sent, and otherwise distributed and/or accessed without compromising the protected access to the file because the file has been encrypted. In some embodiments, the encrypted file includes metadata that identifies which encryption key may be utilized to decrypt the encrypted file. For example, a file system is able to determine which key must be obtained to decrypt the file by reading the metadata of the file.

At 410, the original unencrypted file is deleted. By deleting the original file, only the encrypted version of the file remains to prevent unauthorized access using the original unencrypted file.

Figure 5:
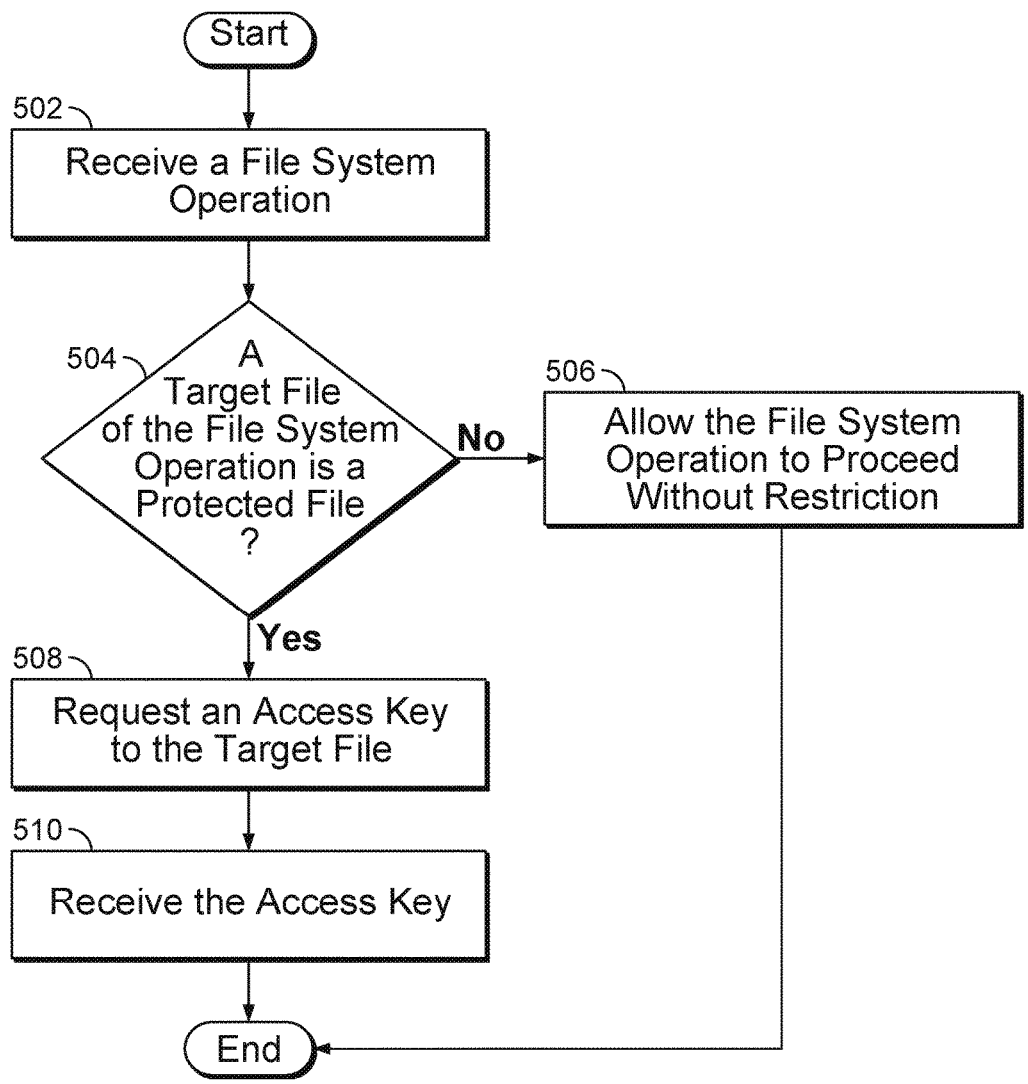
FIG. 5 is a flow chart illustrating an embodiment of a process for accessing a protected file.

FIG. 5 is a flow chart illustrating an embodiment of a process for accessing a protected file. The process of FIG. 5 may be implemented using one or more components of user system 102 of FIG. 1. In some embodiments, the process of FIG. 5 is included in 306 of FIG. 3. For example, the callback of 306 performs at least a portion of the process of FIG. 5.

At 502, a file system operation is received. In some embodiments, the file system operation is the file system operation received in 302 of FIG. 3.

At 504, it is determined whether a target file of the file system operation is a protected file. In some embodiments, the target file is a protected file if the file has been protected using the process of FIG. 4. In some embodiments, the target file is a protected file if the file has been identified as access restricted. In some embodiments, determining whether the target file is a protected file includes analyzing a metadata, if any, of the protected file identifies the target file as a protected file. For example, even a protected target file that has been received as an email attachment from another user system can be automatically accessed by a recipient, if authorized, by allowing the recipient to automatically decrypt the protected target file based on information included in the metadata of the protected target file.

If at 504 it is determined that the target file is not a protected file, at 506 the file system operation is allowed to proceed without restriction. For example, the file system operation is allowed to be processed using an underlying file system without extra processing by a virtual file system to protect the protected files. In some embodiments, the file system operation is allowed to proceed without performing a callback that secures the file system operation.

If at 504 it is determined that the target file is a protected file, at 508, an access key to the target file is requested. In some embodiments, the access key is requested from a remote server (e.g., from access server 110 of FIG. 1). In some embodiments, the access key can be utilized to decrypt the target file. In some embodiments, the request for the access key identifies the process/application that requested the target file, user that requested the target file, identification of the requested access key, a type of access requested, the type of file system operation, and/or other information that may be utilized to determine whether to grant access to the target file. In some embodiments, the access key to the target file is requested using information included in a metadata of the target file. For example, the metadata may specify the identifier of the access key required to access the target file.

At 510, the access key is received, the access key is utilized to decrypt the target file and the file system operation is performed using the decrypted target file. The access key may only access the portion of the target file that has been granted. Different access keys may be able to decrypt/unlock a different version/amount of the target file. By allowing the file system operation to automatically handle data protection, any application of a user may be able to utilize the protected files without modifying the application and/or requiring a user to perform extra steps each time access to the protected file is desired because the file system operation is requested and completed as normal.

Figure 6:
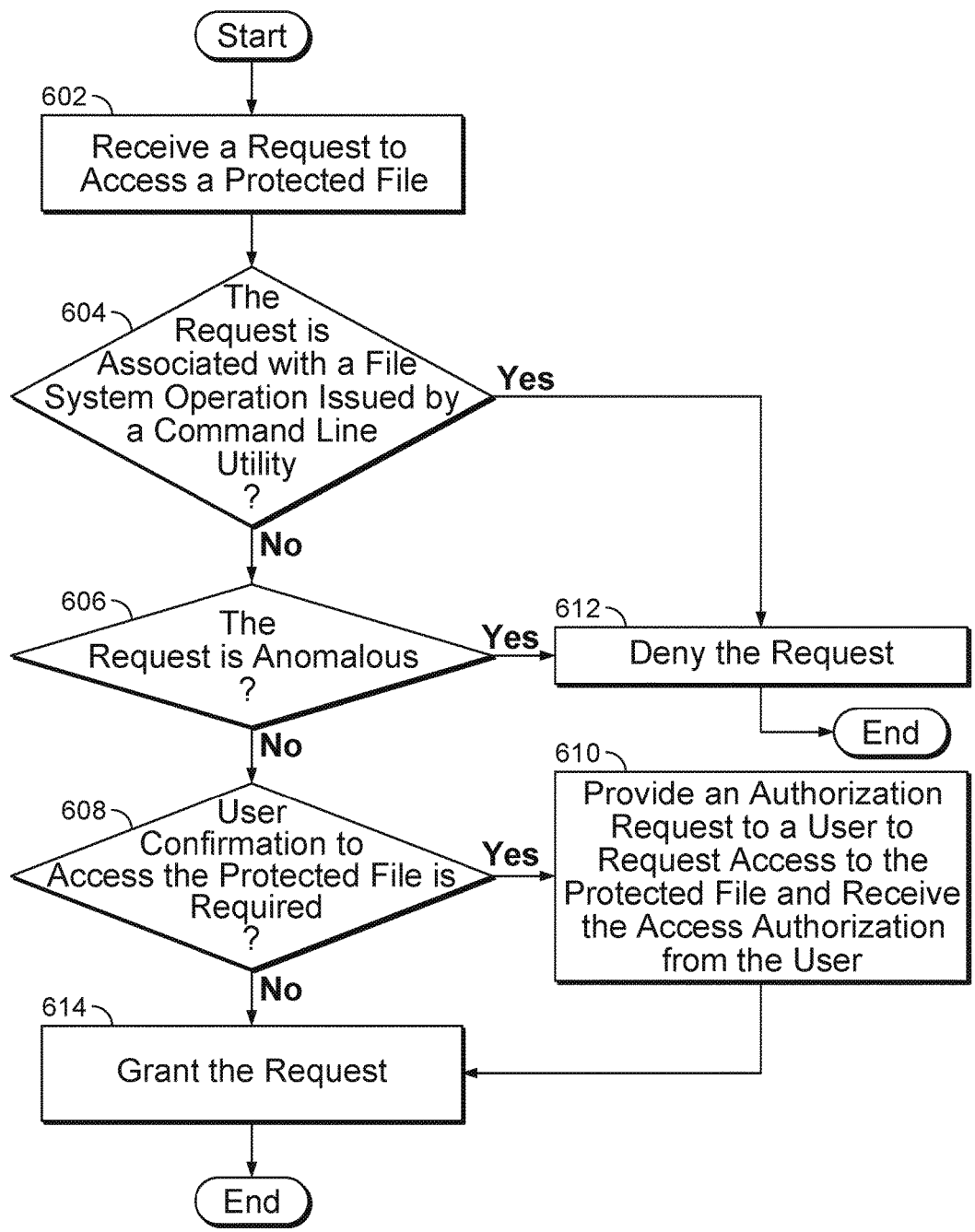
FIG. 6 is a flow chart illustrating an embodiment of a process for providing access to a protected file.

FIG. 6 is a flow chart illustrating an embodiment of a process for providing access to a protected file. The process of FIG. 6 may be implemented using one or more components of access server 110 of FIG. 1.

At 602, a request to access a protected file is received. In some embodiments, the request is the request for the access key in 508 of FIG. 5.

At 604, it is determined whether the request is associated with a file system operation issued by a command line utility. For example, often malware utilizes a command line utility to access files while a user rarely, if ever, accesses files using the command line utility. By disallowing any access to protected files using the command line utility, some forms of malware attacks may be prevented. In some embodiments, only file system operations by signed applications/processes to a protected file are allowed. If at 604 it is determined that the request is associated with a file system operation desired by a command line utility, the process proceeds to 612.

If it is determined at 604 that the request is not associated with a file system operation issued by a command line utility, at 606, it is determined whether the request is anomalous. A server may perform analysis using various historical and other data to determine whether the request is anomalous. For example, various types of information such as how the protected file has been used in the past by the requesting user and other users, a type of content of the protected file, the application/process that requested a file system operation associated with the request, and other information about the request are analyzed by a server to make an assessment of the likelihood the request is an authorized request that should be granted. If the likelihood is greater than a threshold, the request may be determined to be not anomalous. If at 606 it is determined that the request is anomalous, the process proceeds to 612. If at 606 it is determined that the request is not anomalous, the process proceeds to 608. At 612, the request is denied. In some embodiments, rather than denying the request, limited access to the protected file is granted. For example, a limited access to a redacted version of the protected without protected data is provided.

At 608, it is determined whether user confirmation to access the protected file is required. If at 608, it is determined that user confirmation to access the protected file is required, at 610, an authorization request is provided to a user to request access to the protected file and the access authorization is received from the user. For example, a specific user has been configured as the owner of the protected file and a mobile device or another system of the specific user is notified to request a permission from the user to grant access to the protected file. The user may grant and/or deny access using the mobile device. The user may be required to be authorized before being allowed to grant or deny access. In some embodiments, the user may specify a type and/or level of access to be granted.

If at 608 it is determined that user confirmation to access the protected file is not required, or an authorization request to a user to request access to the protected file and receive the access authorization from the user is provided, at 614, the request is granted. In some embodiments, granting the request includes providing an access encryption/decryption key that can be utilized to unlock appropriate access to the protected content. In some embodiments, there exist multiple levels and/or types of access that can be granted and the access key that matches the type/level to be granted is provided. In some embodiments, the type of access to be granted is based at least in part on a type of content of the protected file, the application/process that requested a file system operation associated with the request, and/or other information about the request. For example, different types of access are granted based on which application/process requested the file system operation associated with the request.

Figure 7:
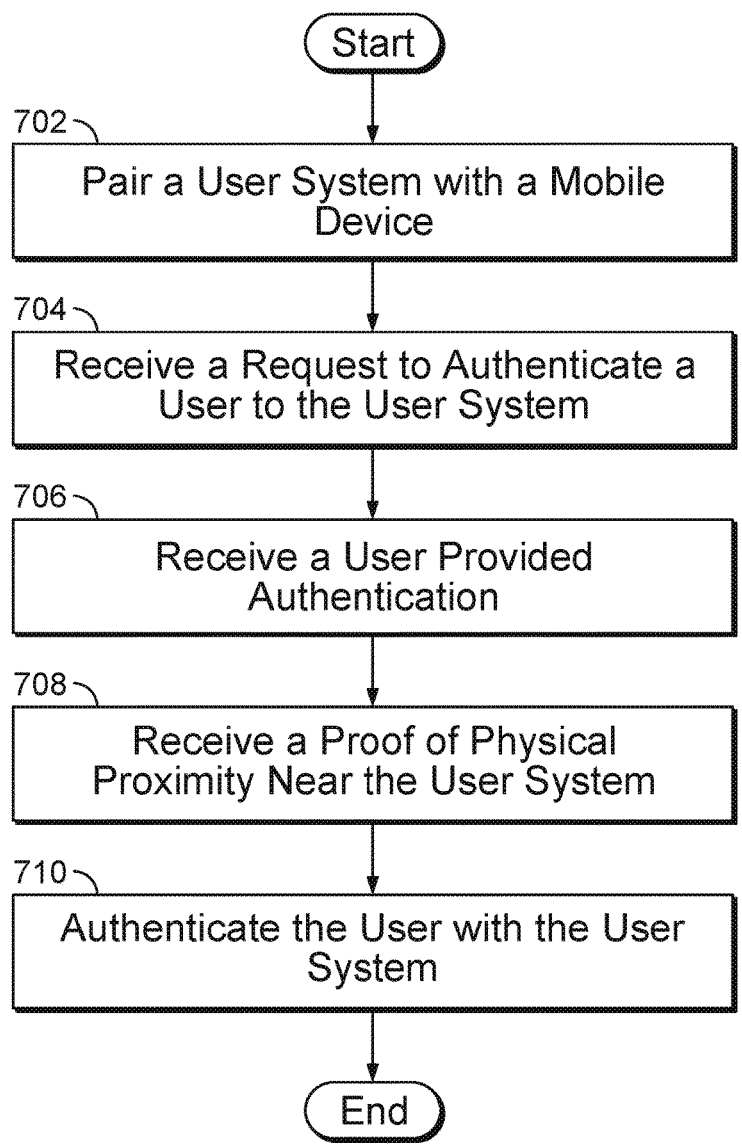
FIG. 7 is a flow chart illustrating an embodiment of a process for authenticating a user with a user system using a mobile device.

FIG. 7 is a flow chart illustrating an embodiment of a process for authenticating a user with a user system using a mobile device. The process of FIG. 7 may be implemented using one or more components of mobile device 118 of FIG. 1. In some embodiments, the process of FIG. 7 may be utilized to authenticate a user desiring to access and/or grant access to protected content. By utilizing a mobile device to authenticate a user with a user system, security benefits of two-factor authentication, bio metric authentication, and/or physical proximity authentication may be achieved.

At 702, a user system is paired with a mobile device. Examples of the mobile device include a cellphone, a smartphone, a tablet computer, a smart watch, and any other portable and/or wearable computer. In some embodiments, pairing the user system with a mobile device includes associating together the user system with a mobile device to allow the mobile device future authentication of the user with the user system.

At 704, a request to authenticate a user to the user system is received. In some embodiments, the user indicates using the mobile device that the user desires to authenticate the user to the user system. In some embodiments, by authenticating the user to the user system, the user is able to access a protected file of the user system.

At 706, a user provided authentication is received. In some embodiments, the user provided authentication includes a password and/or a biometric authentication (e.g., finger print authentication received using finger print reader, facial recognition received using camera, etc.).

At 708, a proof of physical proximity near the user system is received. In some embodiments, the receiving the proof includes receiving a proof of physical proximity between the user system and the mobile device. For example, a local wireless connection (e.g., BLUETOOTH) must be established between the user system and the mobile device and/or a camera of the mobile device must capture an identifier displayed (e.g., bar code, QR code, etc.) on a display of the user system.

At 710, the user is authenticated with the user system. In some embodiments, by being authenticated, the user is granted less restrictive access to protected content using the user system.

Figure 8:
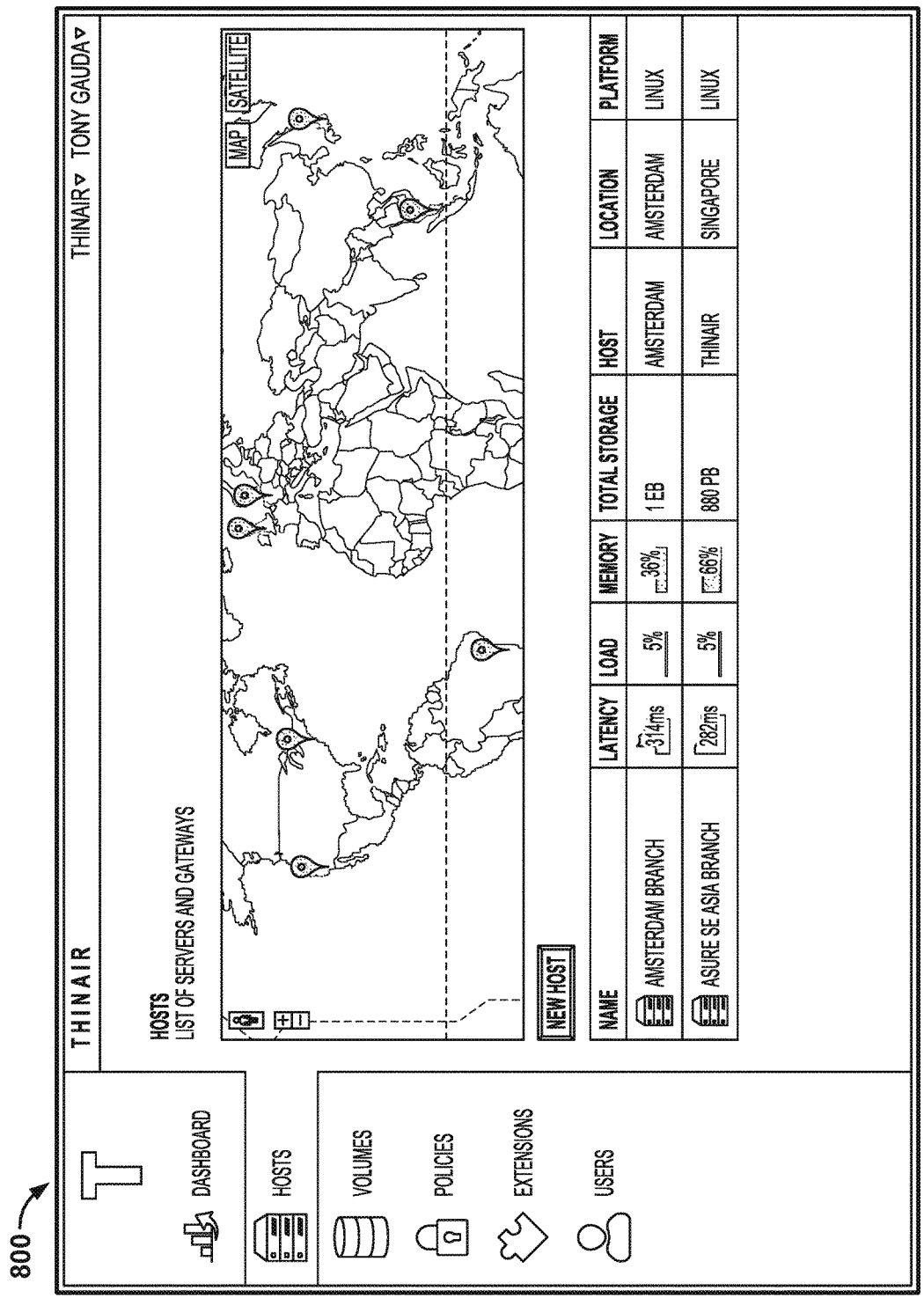
FIG. 8 is a diagram illustrating an embodiment of user interface 800 for a management interface identifying user systems being protected.

FIG. 8 is a diagram illustrating an embodiment of user interface 800 for a management interface identifying user systems being protected.

Figure 9:
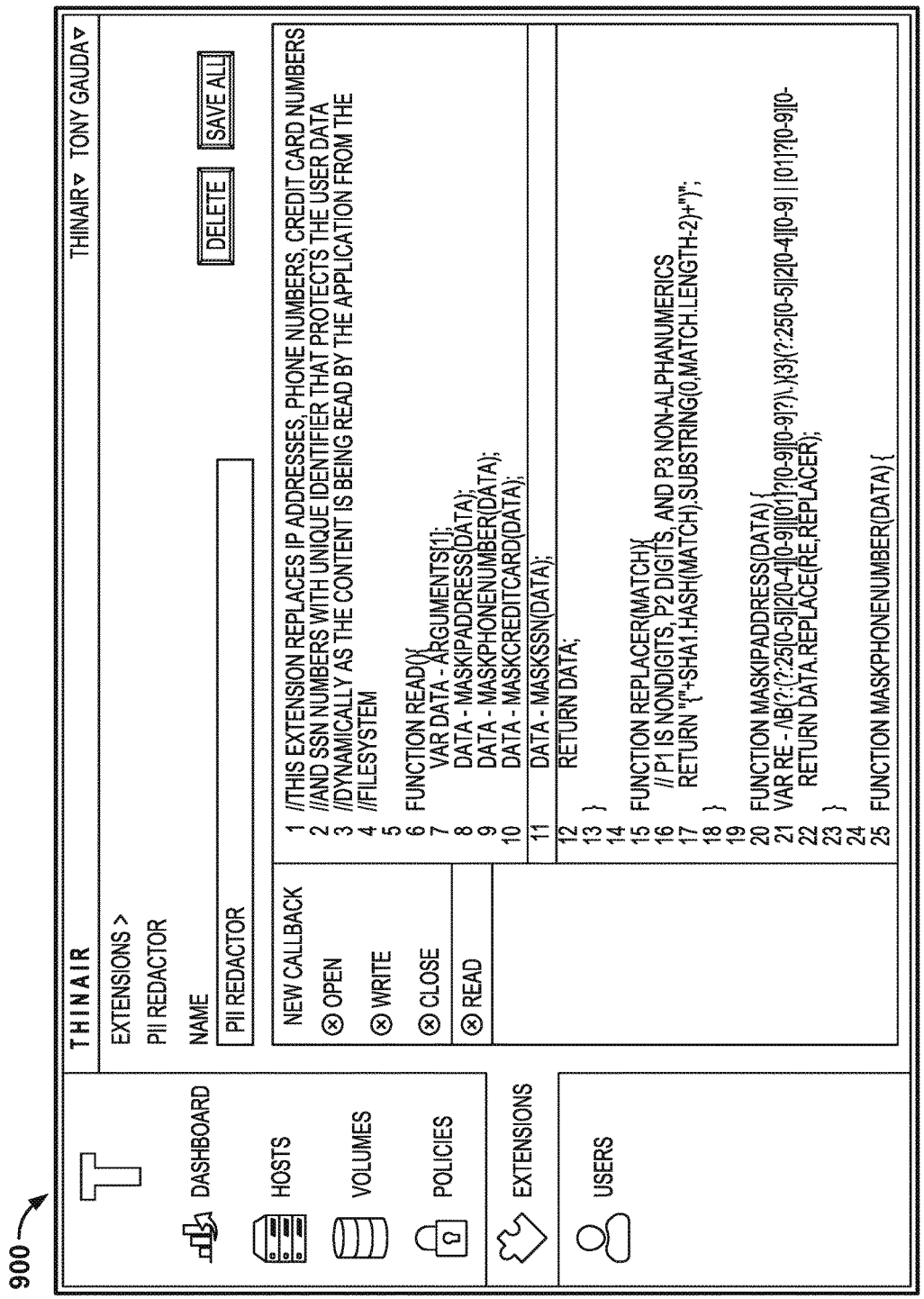
FIG. 9 is a diagram illustrating an embodiment of user interface 900 for specifying a callback extension for a read file system operation.

FIG. 9 is a diagram illustrating an embodiment of user interface 900 for specifying a callback extension for a read file system operation.

Figure 10:
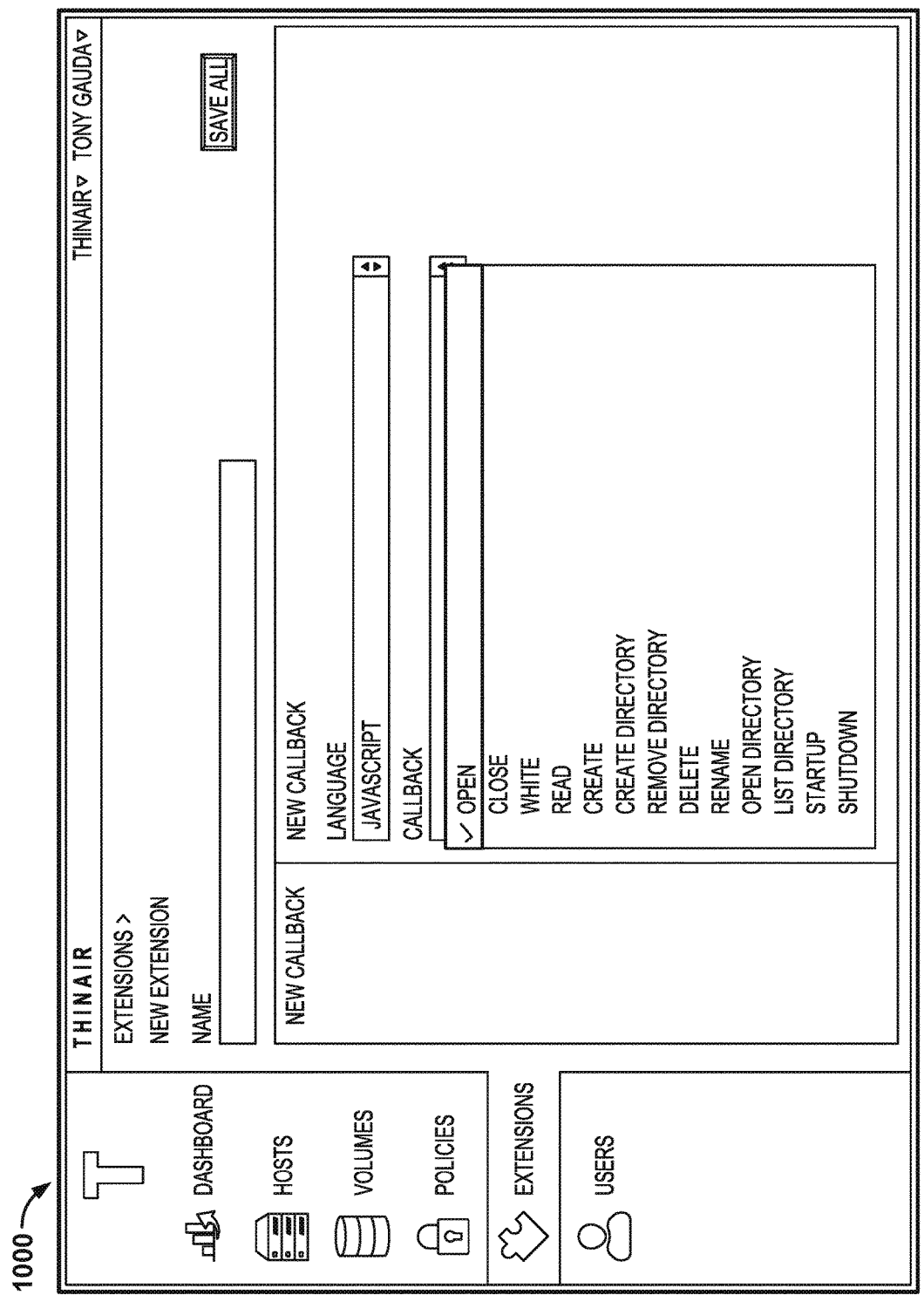
FIG. 10 is a diagram illustrating an embodiment of user interface 1000 for specifying a new callback extension.

FIG. 10 is a diagram illustrating an embodiment of user interface 1000 for specifying a new callback extension.

Figure 11:
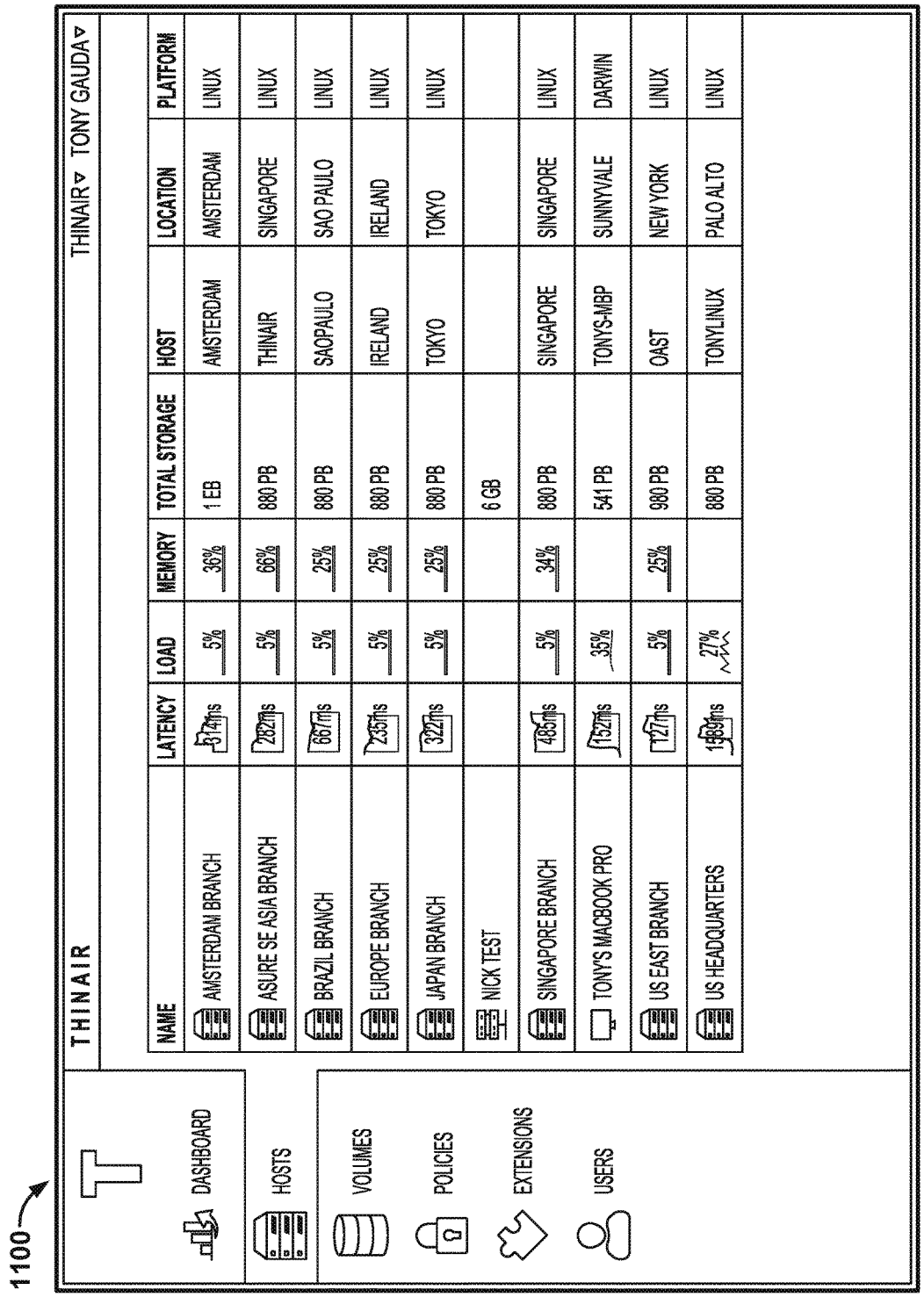
FIG. 11 is a diagram illustrating an embodiment of user interface 1100 for a management interface identifying systems being protected.

FIG. 11 is a diagram illustrating an embodiment of user interface 1100 for a management interface identifying systems being protected.

Figure 12:
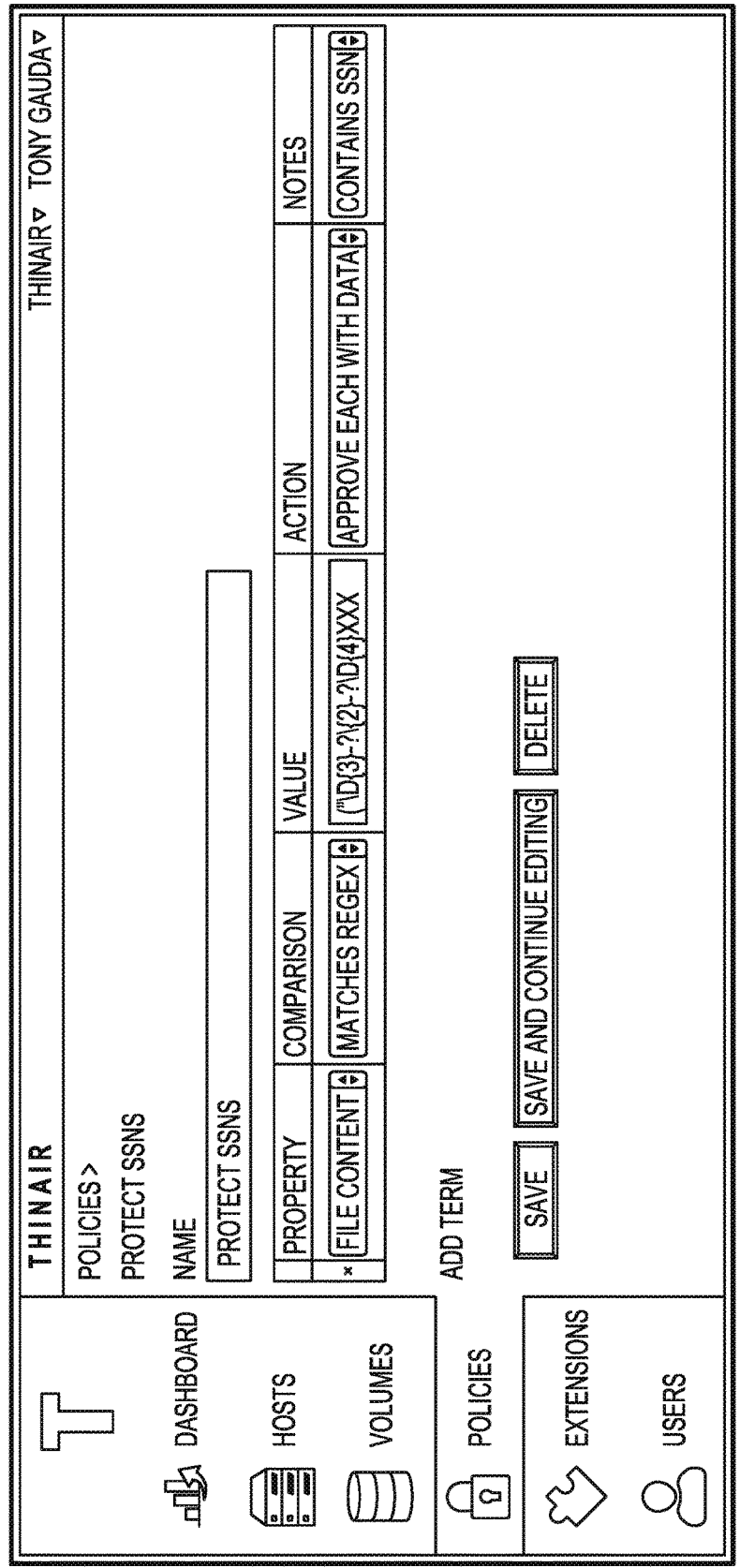
FIG. 12 is a diagram illustrating an embodiment of user interface 1200 for a management interface utilized to define a callback policy to redact social security numbers.

FIG. 12 is a diagram illustrating an embodiment of user interface 1200 for a management interface utilized to define a callback policy to redact social security numbers.

Figure 13:
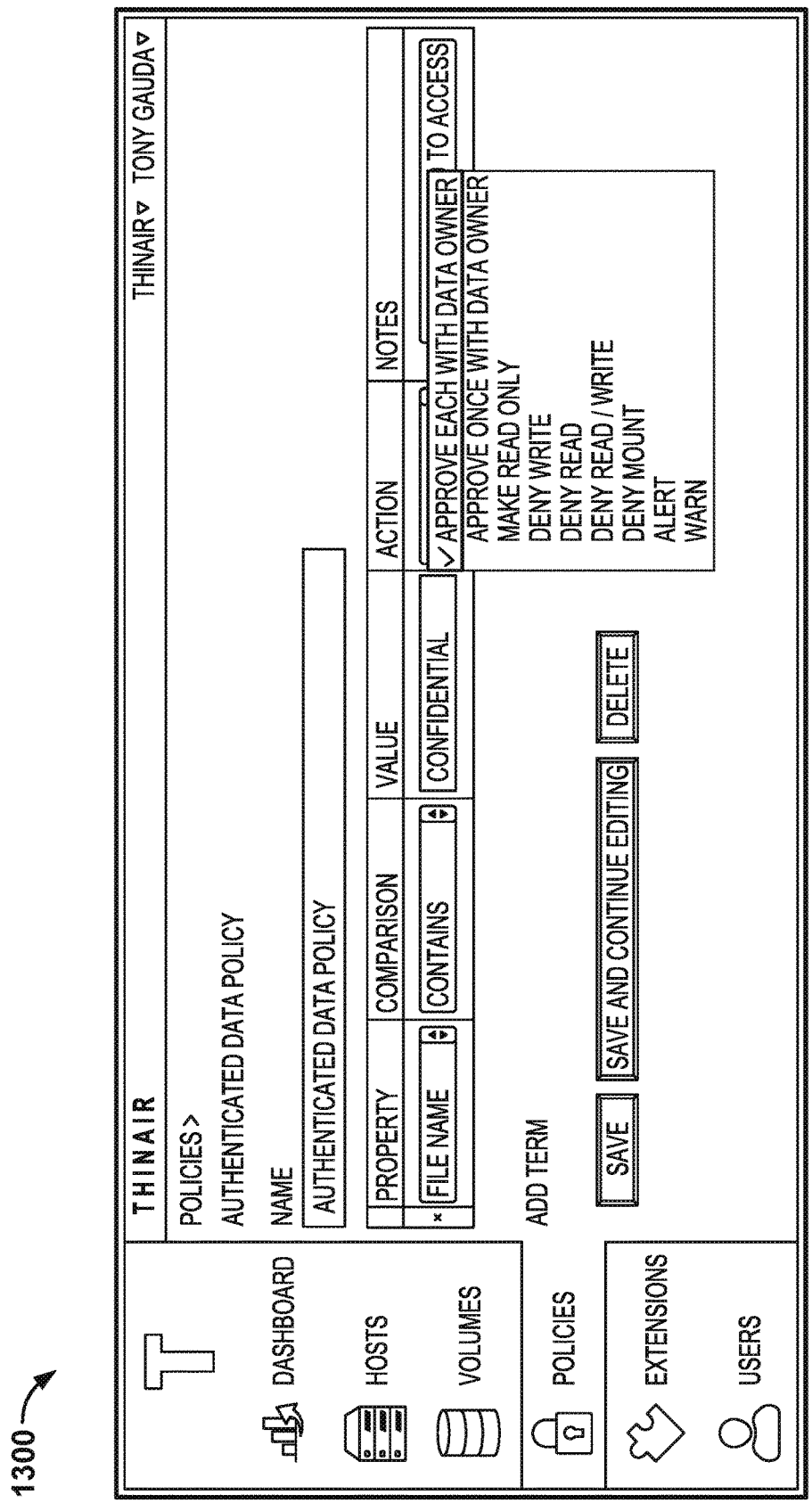
FIG. 13 is a diagram illustrating an embodiment of user interface 1300 for a management interface utilized to define a callback policy to require approval from a data owner before being granted access to a protected file.

FIG. 13 is a diagram illustrating an embodiment of user interface 1300 for a management interface utilized to define a callback policy to require approval from a data owner before being granted access to a protected file.

Figure 14:
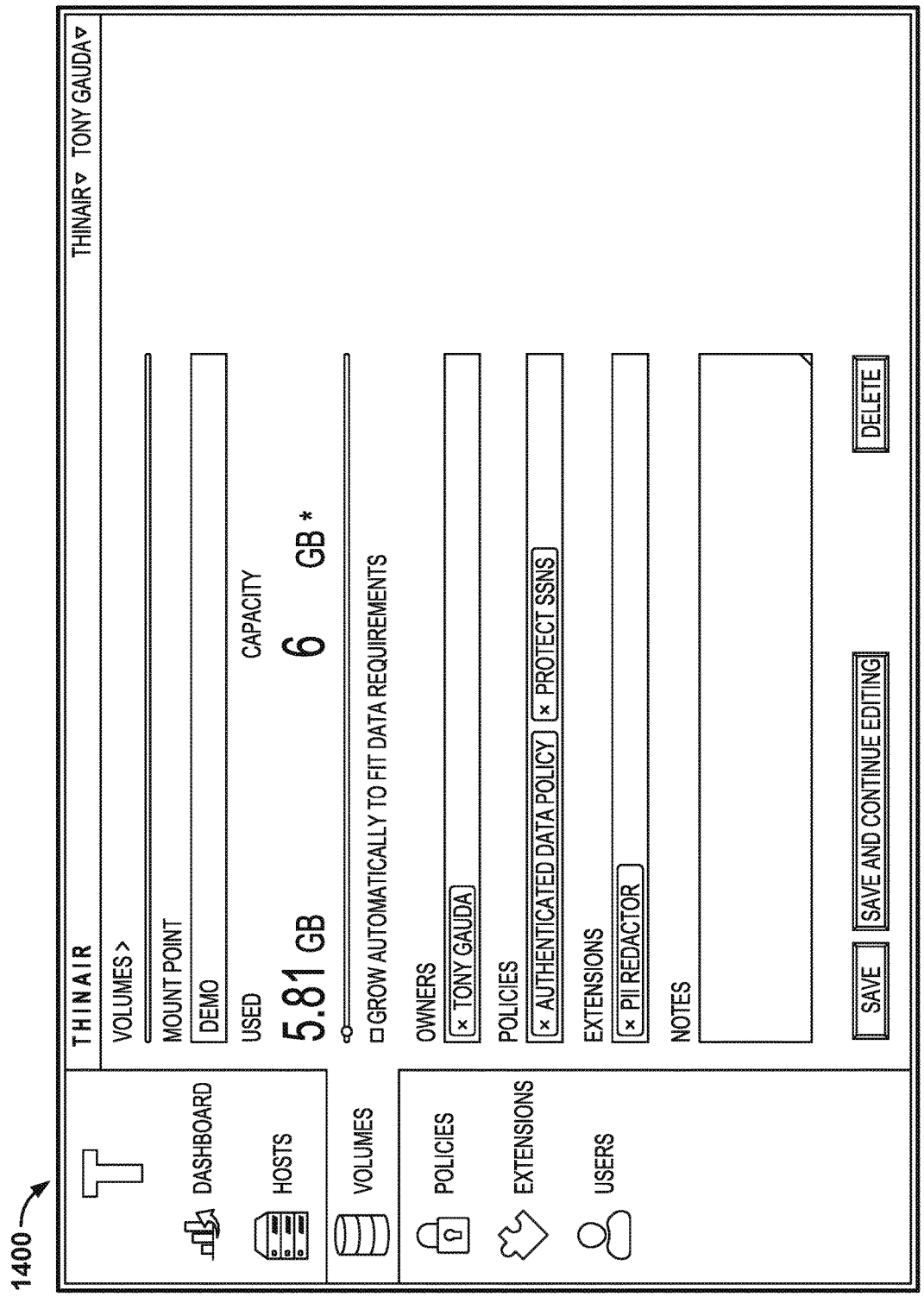
FIG. 14 is a diagram illustrating an embodiment of user interface 1400 for a management interface utilized to configure a storage being protected.

FIG. 14 is a diagram illustrating an embodiment of user interface 1400 for a management interface utilized to configure a storage being protected.

Figure 15:
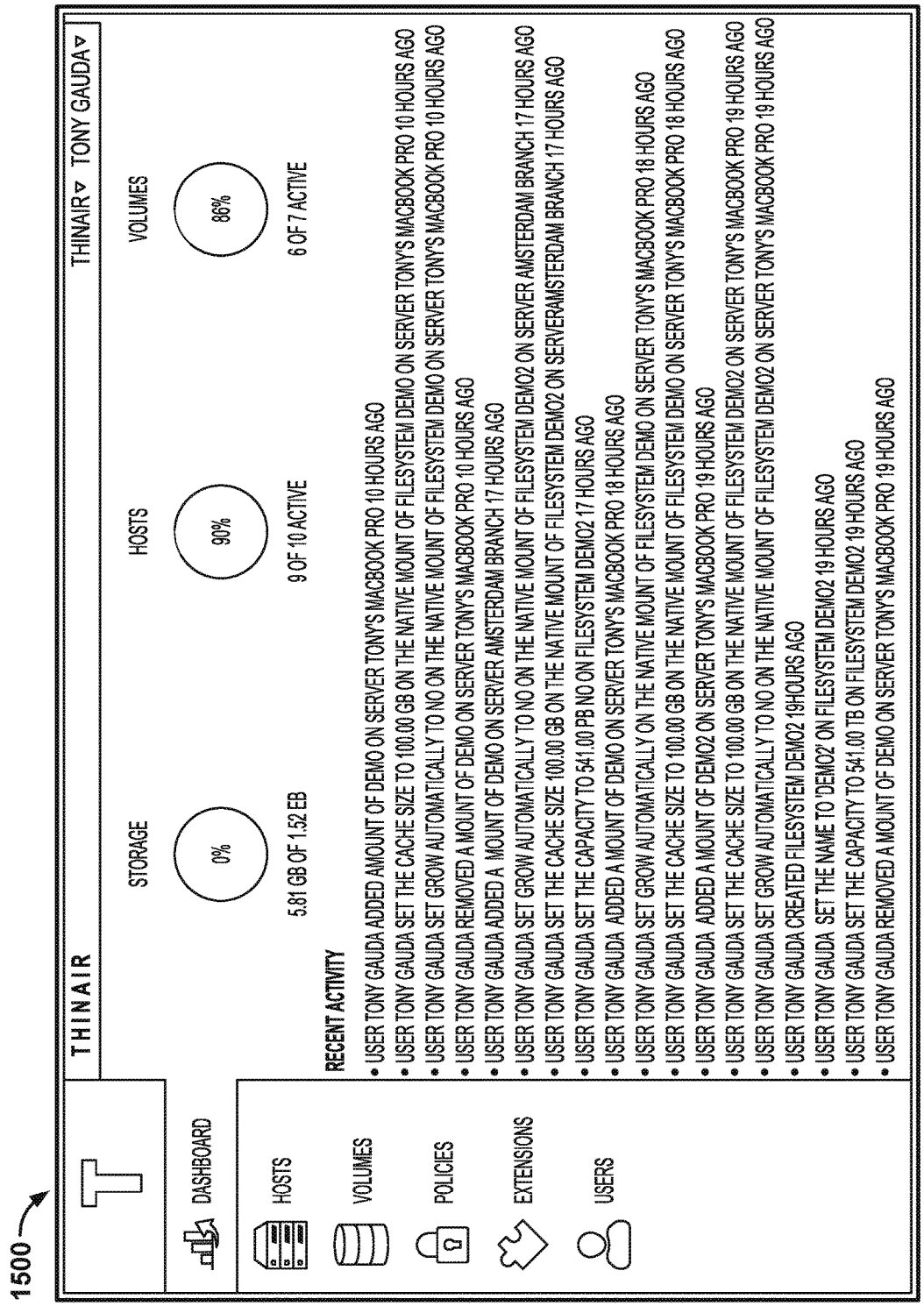
FIG. 15 is a diagram illustrating an embodiment of user interface 1500 for a management interface utilized to view a data protection log and status.

FIG. 15 is a diagram illustrating an embodiment of user interface 1500 for a management interface utilized to view a data protection log and status.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        encrypt at the system a not encrypted file using a cryptography associated with a cryptographic key to generate an encrypted file;
        send the cryptographic key to a remote server;
        delete the original not encrypted file;
        intercept at the same system that generated the encrypted file, a request for a file system operation to the encrypted file that has been encrypted, wherein a decryption key to the encrypted file associated with the sent cryptographic key is stored remotely from the system and the request for the file system operation was intercepted by a virtual file system layer that encapsulates one or more operations of a base file system;
        identify a user-defined callback that corresponds to the file system operation to the encrypted file; and
        execute the user-defined callback that secures the file system operation, wherein executing the user-defined callback includes requesting the decryption key associated with the sent cryptographic key via a network; and
    a memory coupled with the processor, wherein the memory is configured to provide the processor with instructions.

2. The system of claim 1, wherein executing the callback includes redacting a target content included in the encrypted file of the file system operation, wherein redacting the target content includes replacing the target content with replacement characters to indicate that the target content has been redacted.

3. The system of claim 1, wherein the decryption key is the cryptographic key.

4. The system of claim 1, wherein the encryption of the not encrypted file was initiated in response to a user indicated request to encrypt the not encrypted file.

5. The system of claim 1, wherein the cryptographic key was generated by the same system that encrypts the not encrypted file and intercepted the request for the file system operation.

6. The system of claim 1, wherein the encrypted file is stored in a separate logical volume from an original volume where the not encrypted file was stored.

7. The system of claim 1, wherein encrypting the not encrypted file includes using a plurality of different encryption keys that are each associated with a different level of protection of the same not encrypted file.

8. The system of claim 1, wherein the decryption key is one of a plurality of decryption keys associated with different levels of protection of the same file.

9. A method, comprising:
   encrypting at a system a not encrypted file using a cryptography associated with a cryptographic key to generate an encrypted file;
   sending the cryptographic key to a remote server;
   deleting the original not encrypted file;
   intercepting at the same system that generated the encrypted file, a request for a file system operation to the encrypted file that has been encrypted, wherein a decryption key to the encrypted file associated with the sent cryptographic key is stored remotely from the system and the request for the file system operation was intercepted by a virtual file system layer that encapsulates one or more operations of a base file system;
   identifying a user-defined callback that corresponds to the file system operation to the encrypted file; and
   using a processor to execute the user-defined callback that secures the file system operation, wherein executing the user-defined callback includes requesting the decryption key associated with the sent cryptographic key via a network.

10. The method of claim 9, wherein executing the callback includes redacting a target content included in the encrypted file of the file system operation, wherein redacting the target content includes replacing the target content with replacement characters to indicate that the target content has been redacted.

11. The method of claim 9, wherein the decryption key is the cryptographic key.

12. The method of claim 9, wherein the encryption of the not encrypted file was initiated in response to a user indicated request to encrypt the not encrypted file.

13. The method of claim 9, wherein the cryptographic key was generated by the same system that encrypts the not encrypted file and intercepted the request for the file system operation.

14. The method of claim 9, wherein the encrypted file is stored in a separate logical volume from an original volume where the not encrypted file was stored.

15. The method of claim 9, wherein encrypting the not encrypted file includes using a plurality of different encryption keys that are each associated with a different level of protection of the same not encrypted file.

16. The method of claim 9, wherein the decryption key is one of a plurality of decryption keys associated with different levels of protection of the same file.

17. A computer program product, the computer program product being embodied in a non-transitory computer readable storage medium and comprising computer instructions for:
   encrypting at a system a not encrypted file using a cryptography associated with a cryptographic key to generate an encrypted file;
   sending the cryptographic key to a remote server;
   deleting the original not encrypted file;
   intercepting at the same system that generated the encrypted file, a request for a file system operation to the encrypted file that has been encrypted, wherein a decryption key to the encrypted file associated with the sent cryptographic key is stored remotely from the system and the request for the file system operation was intercepted by a virtual file system layer that encapsulates one or more operations of a base file system;
   identifying a user-defined callback that corresponds to the file system operation to the encrypted file; and
   executing the user-defined callback that secures the file system operation, wherein executing the user-defined callback includes requesting the decryption key associated with the sent cryptographic key via a network.

18. The computer program product of claim 17, wherein executing the callback includes redacting a target content included in the encrypted file of the file system operation, wherein redacting the target content includes replacing the target content with replacement characters to indicate that the target content has been redacted.

19. The computer program product of claim 17, wherein the decryption key is the cryptographic key.

* * * * *